3,403,754
BRAKE RETURN AND AUTOMATIC
ADJUSTMENT MEANS
Robert David Barrett, Westchester, and Kazys Raciunas,
Cicero, Ill., assignors to International Harvester Company, Chicago, Ill., a corporation of Delaware
Filed Apr. 27, 1967, Ser. No. 634,259
2 Claims. (Cl. 188—72)

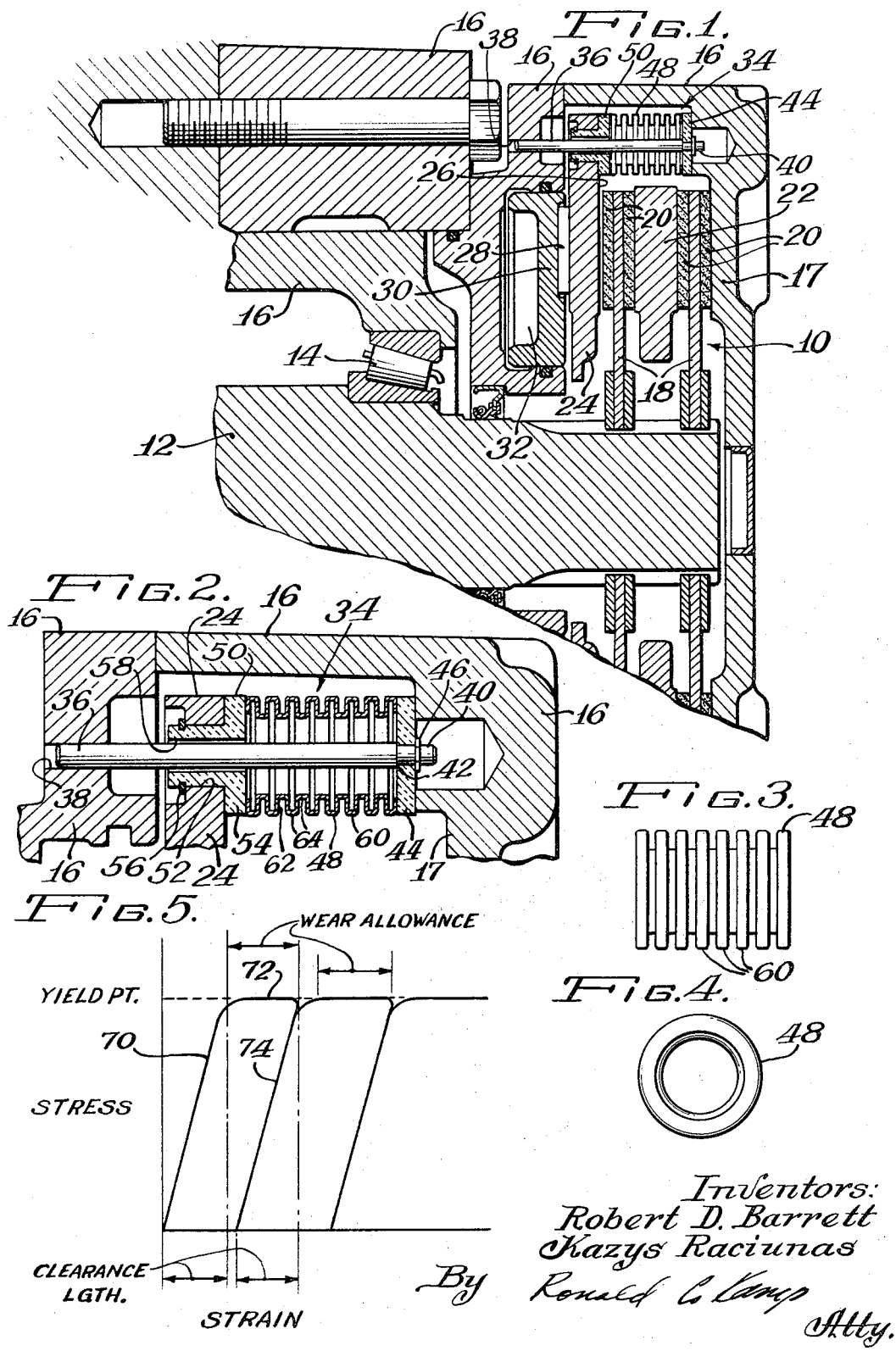

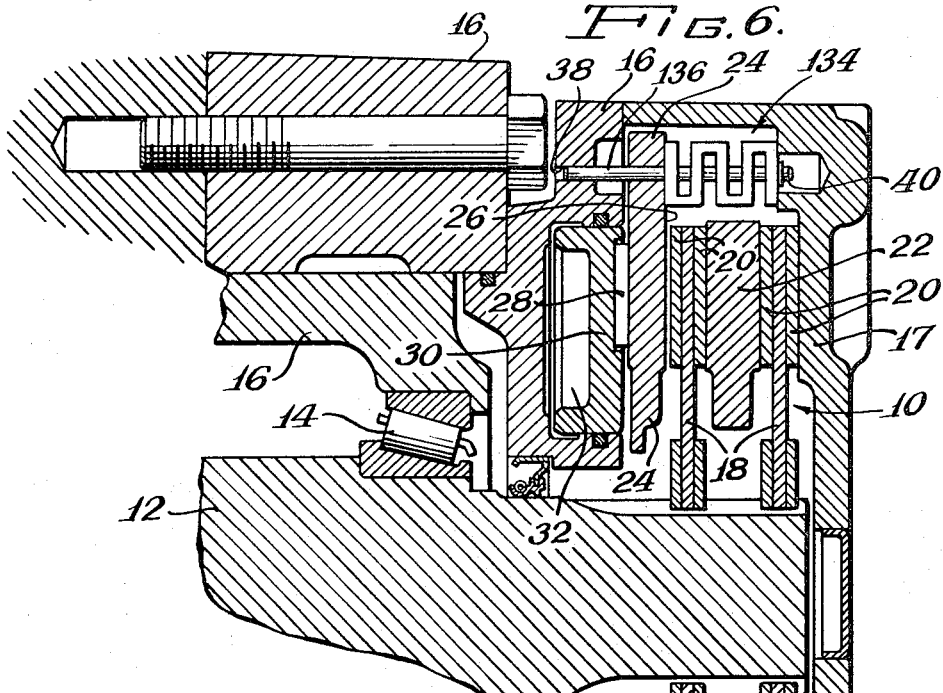
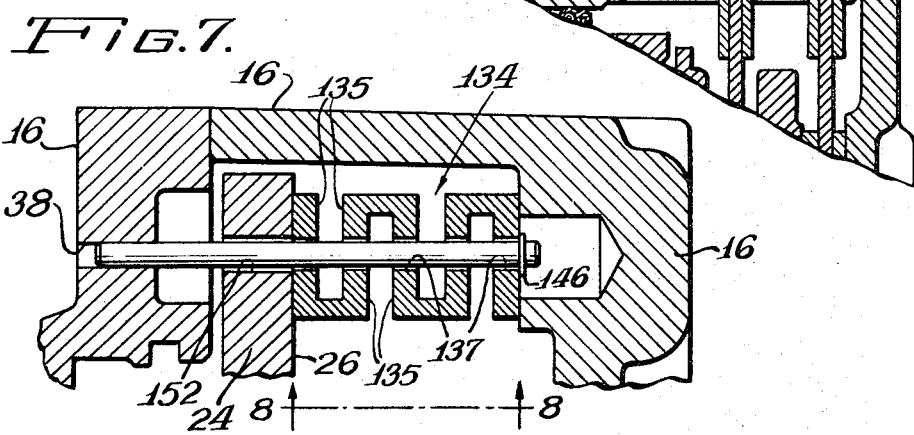
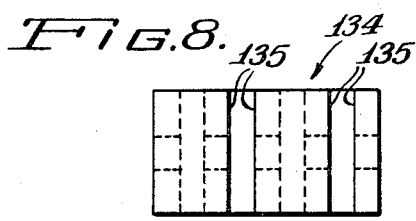
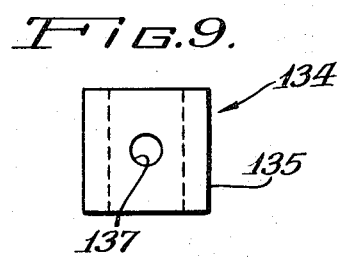
Inventors:
Robert D. Barrett
Kazys Raciunas United States Patent Office 3,403,754
Patented Oct. 1, 1968

ABSTRACT OF THE DISCLOSURE

The invention relates to a disk brake having a plurality of rotor disks affixed to a rotatable axle, a stator disk carried by a stationary housing, and a pressure plate movable under the influence of a hydraulically actuated piston to force said disks into frictional engagement with the housing. A means for automatically compensating for wear of the disks and for allowing separation of the disks upon release of the hydraulic pressure is positioned between the housing and pressure plate.

Background and summary of the invention

The present invention relates to wheel brakes for vehicles generally, and more particularly, to wheel brakes which move parallel to the axis of rotation.

After repeated applications of the brake, the disks, or the linings affixed thereto, will become worn, necessitating an increase in the travel or movement of the brake pedal which is depressed by the operator of the vehicle. It is, therefore, desirable to adjust the disks to compensate for this wear in order to maintain a relatively constant amount of free travel or play in the pedal movement before the brakes are applied. Many attempts have been made in the prior art to provide compensation for the wear on the brake linings automatically. In addition, the pressure plate which is forced against the disks to frictionally engage them is often actuated by fluid pressure, which pressure cannot supply a retracting force, and hence, due to frictional resistance between the movable elements of the brake, and also due to the presence of a small residual or precharge pressure, the plate is never fully retracted to provide a running clearance between the disks. The lack of such clearance causes the disks to drag or rub, resulting in over-heating and excessive wear even when the brake is not being applied. The prior art is replete with mechanisms to retract the pressure plate or otherwise disengage the brake following release of the actuating pressure. However, in all the prior art devices the automatic adjusting means and the return means are provided as separate and distinct elements. Providing these means as separate elements, while functionally satisfactory, results in a product which is costly due to the large number of components required, which is complicated to assemble and disassemble, and which requires space within the housing to be provided to accommodate the separate elements. In most disk brake applications the latter consideration is of primary importance because the space limitations are critical, and any means which will effect a compact structure is eagerly sought.

It is, therefore, an object of the present invention to provide a disk brake which is compact, easily assembled, and relatively inexpensive.

It is also an object of the present invention to provide a unitary element for a disk brake which will serve both as a means for automatically compensating for wear, and as a spring means to release the brake.

These and other objects and many of the attendant advantages of the present invention will become more readily apparent upon a perusal of the following description and the accompanying drawings.

Brief description of the drawings

FIGURE 1 is a cross-sectional view in elevation, with portions broken away or omitted, of a disk brake incorporating a preferred embodiment of the present invention;

FIGURE 2 is an enlarged view of a portion of FIGURE 1 showing the details of the unitary element installed within the brake;

FIGURE 3 is a side elevational view of the unitary element shown in FIGURES 1 and 2;

FIGURE 4 is an end view of the unitary element shown in FIGURE 3;

FIGURE 5 is a graph showing the relationship between the load to which the element is subjected and the strain or deformation;

FIGURE 6 is a cross-sectional view in elevation, with portions broken away or omitted, of a disk brake incorporating another embodiment of the present invention;

FIGURE 7 is an enlarged view of a portion of FIGURE 6 showing the unitary element in cross-section;

FIGURE 8 is a bottom plan view, taken from line 8—8 of FIGURE 7, of the elements; and FIGURE 9 is a side elevational view of the element shown in FIGURE 8.

Description of the preferred embodiment

Referring now to FIGURES 1 and 2, a disk brake mechanism, indicated generally at 10, is utilized to stop or retard an axle 12 rotatably mounted by a bearing 14 within a housing 16 having a vertical wall 17, which housing for convenience of manufacture may consist of several parts, but which are secured together and function as a unitary structure. The brake mechanism 10 includes a pair of rotor disks 18 having a lining 20 secured to opposite faces thereof. The rotor disks are keyed or otherwise secured to, but axially slidable on, the axle 12 and rotate therewith. A stator disk 22 is positioned between the rotor disks 18 and secured to the housing 16, but is movable with respect to the housing along the axis of the axle 12. The primary or pressure plate 24 is retained within, and is movable with respect to the housing 16 axially of the axle 12. The primary plate 24 has a flat surface 26 formed on one side for engagement with the lining 20 on the inner surface of the inboard rotor disk 18, and has a heat insulating washer 28 secured to the other side thereof. The washer 28 provides a surface or area, through which the conduction of heat is poor, for contacting an annular piston 30 which is suitably sealed for movement within an annular chamber 32 formed in the housing 16. Conventional means are provided for admitting fluid under pressure to the chamber 32 to apply or engage the brake mechanism 10 and for venting or draining the fluid in order to release or disengage the brake mechanism 10. Specifically, the fluid under pressure within the chamber 32 acts upon the piston 30 forcing it outward from the chamber, i.e., to the right as viewed in FIGURE 1, into contact with the washer 28. The primary plate is thereby shifted to the right forcing the disks 18 and 22 into engagement with each other and with the wall 17. The normal force supplied by the fluid pressure acting upon the piston 30 determines the frictional force produced by the brake to stop or retard the axle 12, assuming, of course, that the coefficient of friction between the linings 20 and the wall 17, the stator disk 22 and the primary plate 24 remains constant. The amount of movement or travel by the piston 30 required to bring all of those elements positioned between the wall 17 and the piston 30 into contact with each other is termed the clearance. In order to maintain this clearance approximately constant, an adjustment has to be made for the wear encountered in the linings 20. Since there is frictional resistance to return of these elements to their original positions upon release of the pressure and since there is a slight precharge pressure within the chamber 32, some return force is required to provide this clearance. Both of these functions are accomplished by the combined return and adjustment means, indicated generally at 34, which consists of a plurality of guide pins 36 which are retained in bores 38 formed substantially parallel to the axle 12 and appropriately spaced therearound. The free end of each pin 36 has a reduced diameter portion 40 forming a shoulder 42. A washer 44 is retained on the portion 40 between the shoulder 42 and a snap ring 46. A bellows 48 is glued or otherwise secured at one of its ends to the washer 44 and is similarly secured at its other end to a flanged grommet 50, which grommet is made of heat insulative material. Since the length of the bellows 48 is critical and since it is formed of a material, such as copper, for example, having a high coefficient of thermal expansion, it is important to isolate the bellows from the friction-generated heat in the primary plate 24. The grommets 50 are positioned in openings 52 provided in the primary plate 24 and are retained therein by the flange 54 and a snap ring 56 on the grommets 50. The grommets are spaced to slidably accept the pins 36 which extend through bores 58 in the grommets of larger diameter than the pins. The bellows 48 comprise a plurality of rolls or corrugations 60 formed with extremely small radius bends to provide a series of radial walls 62 transverse to the pins 36 joined by circumferentially extending surfaces 64 parallel to the pins. When the bellows 48 is placed under compression by movement of the primary plate 24 to the right as viewed in FIGURE 1 under the influence of fluid pressure acting on the piston 30, the stresses imposed thereon will be concentrated in the area of the small radius bends. Thus, the stress in this area will reach the yield point, resulting in plastic or permanent deformation, while the stress in all other areas of the bellows will remain within the elastic range. The load imposed on each bellows is a function of the amount of travel of the piston 30 and the primary plate 24. That is, the bellows 48 will be subjected only to that force necessary to take up the clearance, for once that happens any additional force will be resisted solely through the disks 18 and 22. When the bellows is initially installed it has a length sufficient to provide the desired clearance between the linings 20, the wall 17 and the primary plate 24. When fluid under pressure is admitted to the chamber 32, the piston will be urged outward from the chamber forcing the primary plate 24 to compress the linings 20, the stator disk 22 and the wall 17 into frictional engagement thereby transmitting a braking effort to the axle 12. Simultaneously, the bellows 48 will elastically compress and when the pressure in the chamber 32 is released, the bellows will expand returning the primary plate 24 and the piston 30 to their original positions and providing the desired clearance. This response is represented by the straight lines 70 in the graph of FIGURE 5. However, when the linings become worn, the piston 30 and the primary plate 24 must travel a greater distance to compress the disks 18 and 22 against the wall 17. The resulting strain creates stresses in those areas around the sharp bends of the roll 60 which are above the elastic limit. A permanent set or plastic deformation occurs in these areas, while other areas are elastically deformed. Upon release of the pressure, the bellows 48 will again expand, due to the restoring force of the elastically deformed areas and the piston 30 and the primary plate 24 will be returned to a position which is different from their original positions but which is sufficient to provide the desired clearance. That portion of the graph designated at 72 illustrates the plastic deformation occurring in the bellows under such conditions, while the line 74 illustrates the relaxation of the elastically deformed portions. Elastic deformation thereafter follows the line 74, upon both compression and re-expansion, until sufficient wear of the linings occurs to cause further plastic deformation. This procedure will be repeated as the linings 20 continue to be worn down by repeated applications of brake mechanism 10. The plastic deformation in the bellows 48 in order to compensate for this wear will result in the alternate circumferential surfaces 64 approaching each other until they are in contact. By proper selection of the number of corrugations or rolls 60 as well as the spacing between the vertical walls 62, the bellows can be made to function as a means for indicating the limit of the permissible wear on the linings 20. That is, when the alternate circumferential surfaces of the bellows are all in contact extremely high pedal forces will be required to actuate the brake mechanism 10. Such high forces would provide the operator with sufficient indication that the linings are worn to the point where replacement thereof is needed.

A second embodiment of the present invention is illustrated in FIGURES 6–9, and is incorporated into a disk brake mechanism similar to that shown in FIGURES 1–4; identical reference characters being utilized to indicate common elements. The combined return and adjustment means 134 of this embodiment comprises a series of connected walls 135, which are shown as being parallel but do not necessarily have to be so oriented. The walls 135 are drilled to provide coaxial openings 137 through which a guide pin 136 may be inserted. The guide pin 136 is retained in and extends from a bore 38 in the housing 16, through an opening 152 in the primary plate 24, through openings 137 in the walls 135 and beyond the combined means 134. A snap ring 146 retains the means 134 on the pin 136 between the housing 16 and the primary plate 24. The combined means or unitary element 134 is sized and shaped to exhibit the same physical characteristics illustrated in the graph of FIGURE 5. That is, as the brake is applied by moving the primary plate toward the disks 18 and 22, the walls 135 will be forced toward each other. When the linings 20 are unworn, the primary plate will attain the limit of its travel before any point in the element 134 is stressed beyond its elastic limit. Release of the primary plate will then permit the elements 134 to return the primary plate to its original position providing proper running clearance. However, as the linings become worn, the additional travel required of the primary plate will strain the element 134 to the extent that some areas of the element will be stressed beyond the elastic limit. The resulting plastic deformation will compensate for the amount of wear and the other areas of the element stressed below the elastic limit will provide the return bias to position the primary plate so that adequate running clearance is afforded.

The embodiment of FIGURES 6–9 provides certain advantages over the first embodiment, viz., it is less expensive to manufacture and easier to assemble. In addition, it can be formed of a material which is less sensitive to heat, i.e., a lower coefficient of thermal expansion, thereby eleminating the need to provide insulation between the primary plate and the element. The reduction in the number of separate parts required simplifies manufacture and assembly.

It will be appreciated from the foregoing that the present invention does not provide a combined automatic wear compensating and return means for a disk brake. In addition to providing a compact brake, which in itself is highly desirable, the present invention provides an arrangement which can easily be manufactured and assembled. Sub-assembly techniques readily lend themselves to the combined means shown in FIGURE 1, since the bellows 48 can be cemented to the washer 44 and the grommet 50 at a remote location and under conditions ideal for such an operation. The sub-assembly can then easily be installed into its proper location by merely inserting the two snap rings 46 and 56. Such a procedure not only decreases the chances for damaging the sub-assembly, but facilitates the relining of the rotor disk 17, the relining operation also necessitating replacement of the bellows 48. The embodiment of FIGURE 6 is even easier to assemble and requires no sub-assembly, since it is retained on the guide pin directly by the snap ring 146.

What is claimed is:
1. In a disk brake for braking an axle rotatably mounted in a housing, said brake having a plurality of axially slidable rotor and stator disks mounted about said axle within said housing in coaxial interleaved position, actuating means operative within said housing and movable between an engaged position wherein frictional braking engagement of said disks is effected by axially compressing said disks into frictional interengagement, and a relaxed position wherein said actuating means is spaced from said disks to provide a running clearance; the improvement comprising:
   an automatic adjusting and return means interposed between said actuating means and said housing, and including a plurality of radial walls interconnected by substantially perpendicular circumferentially extending, and alternately radially spaced surfaces;
   the connection of said walls and surfaces being areas of stress concentration when said automatic means is compressed upon movement of said actuating means to the engaged position, whereby stress in said areas being below the yield point when the strain is no greater than said clearance and above the yield point when the strain is greater than said clearance so that wear of the disks is automatically compensated and proper running clearance is maintained.
2. In a disk plate according to claim 1 wherein the total space between said walls is equal to the amount of permissible wear on said disks.

References Cited
UNITED STATES PATENTS

| | | | |
|---|---|---|---|
| 2,499,684 | 3/1950 | Sanmori | 188—196 X |
| 2,743,790 | 5/1956 | Bricker | 188—196 X |
| 3,286,795 | 11/1966 | Barrett et al. | 188—196 X |

GEORGE E. A. HALVOSA, *Primary Examiner.*